W. WOLFF.
STEERING WHEEL FOR MOTOR CARS AND FLYING MACHINES.
APPLICATION FILED MAR. 6, 1913.
1,131,888.
Patented Mar. 16, 1915.
2 SHEETS—SHEET 1.
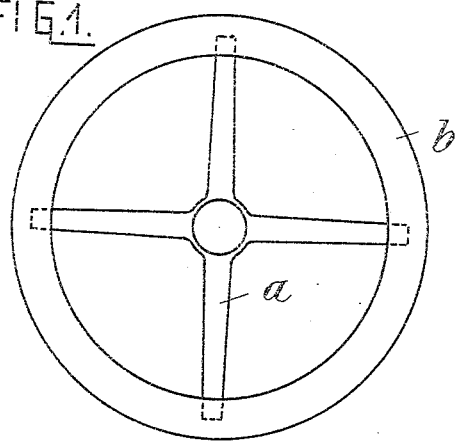
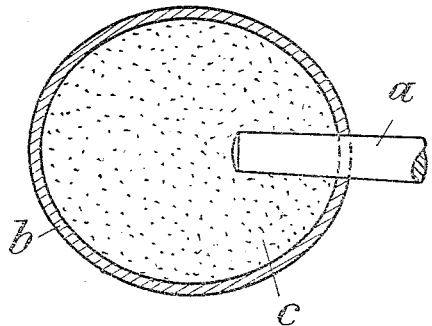
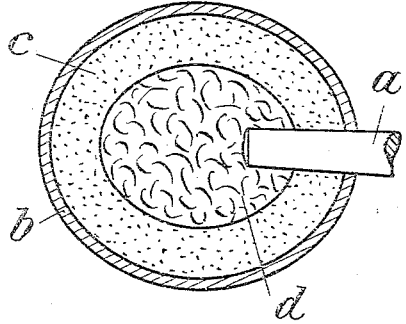
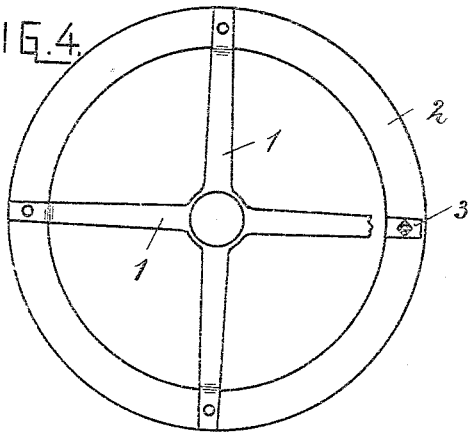
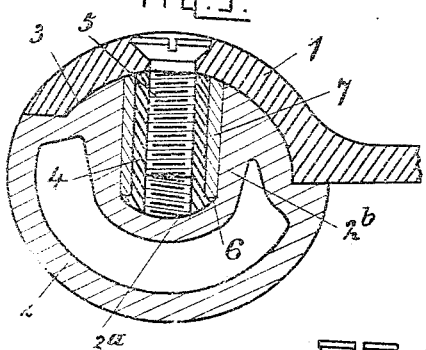
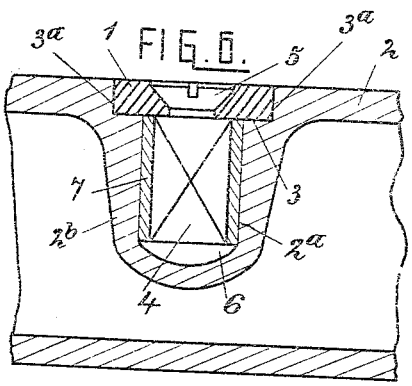
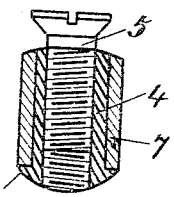
Witnesses:
Emma A. McCarrick
Charles Jacobs
Inventor:
Willy Wolff
by L. K. Böhm,
Attorney.

UNITED STATES PATENT OFFICE.

WILLY WOLFF, OF NUREMBERG, GERMANY.

STEERING-WHEEL FOR MOTOR-CARS AND FLYING-MACHINES.

1,131,888.  Specification of Letters Patent.  Patented Mar. 16, 1915.

Application filed March 6, 1913. Serial No. 752,274.

*To all whom it may concern:*

Be it known that I, WILLY WOLFF, subject of the German Emperor, and a resident of Nuremberg, Germany, have invented certain new and useful Improvements in Steering-Wheels for Motor-Cars and Flying-Machines, of which the following is a specification.

Figure 8:
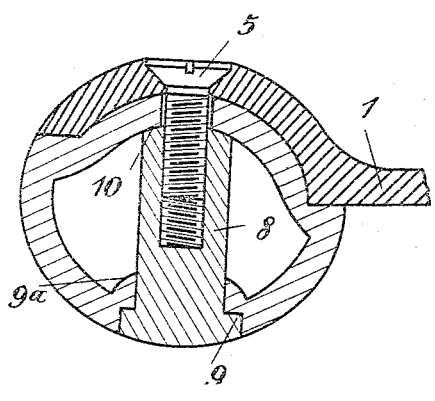
Figure 10:
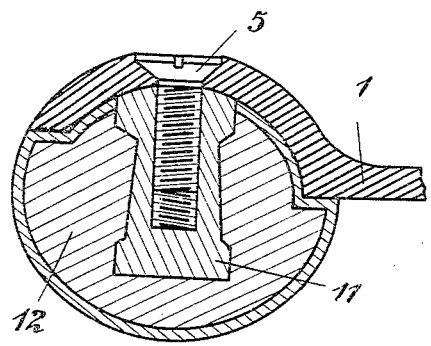
Figure 11:
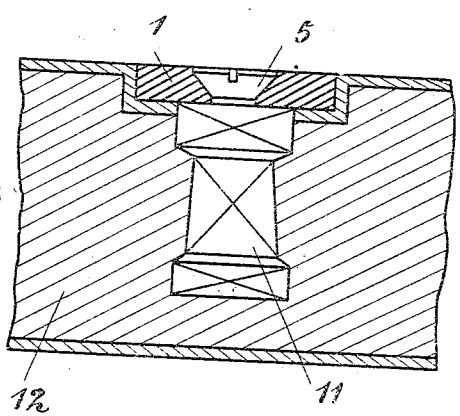

This invention has reference to improvements in steering wheels for motor cars, flying machines and the like. The rims of the steering wheels for motor cars, flying machines and the like consist usually of wood, because metal is a very good conductor of heat and therefore is not adapted for use in such rims. Likewise wooden rims do not satisfy, because they are injured by the weather. Further wooden rims are easily deformed and the attachments between the several parts of the wooden rim and between the wooden rim and the spokes become loose. Another disadvantage of wooden rims is that they lose their color and polish and become of mean appearance.
It is the special purpose of the present invention to overcome the described defects. The novel steering wheels pertain to that type of wheels which are provided with rims neither of metal nor of wood and preferably composed of celluloid. Accordingly, these wheels are non-conductors of heat and weatherproof. They are not subject to deformation as wheels with wooden rims and all parts remain permanently fixed after being assembled. The wheel may be made complete and in some modified form single parts may be interchangeable, all as will be fully described hereinafter with reference to the accompanying drawings in which:
Figure 1 represents in plan view a steering wheel for motor cars and the like embodying in desirable form the present improvements. Fig. 2 is a cross-section of the same on an enlarged scale. Fig. 3 is a cross-section of a somewhat modified form of wheel. Fig. 4 is the plan view of a steering wheel made in two parts, Fig. 5 is the cross section, Fig. 6 the longitudinal section and Fig. 7 a detail view of the same;
Fig. 8 is the cross section and Fig. 9 the longitudinal section of a modification of the divided steering wheel and Figs. 10 and 11 are the sections of an other modification of the same.

The steering wheel according to Figs. 1 and 2 consists of the star or cross-like formed spider *a*, the hollow rim *b* made of celluloid and the filling mass *c*. According to Fig. 3 the filling mass possesses an annular channel *d* for reducing the weight.

The method of making the steering wheel according to Figs. 1 and 2 consists in applying the hollow celluloid rim *b* or another molding, into which the spokes of the spider *a* project with their outer ends and in filling this molding with a material which will harden in a day or so, for instance with cement or a material which is named Steinholz (stone-wood) in the German language. After the hardening a completely firm joint has been formed between the filling mass and the spider, so that the spokes are permanently set in the filling mass. Preferably this molding is not removed after the hardening of the filling mass *c*.

As the filling mass possesses a considerable weight, it is advantageous to lay inside of the molding an annular part forming the annular channel *d* within the filling mass *c*. This part is retained in the wheel and if it consists of reed or other suitable material tends to reduce the weight of the steering wheel.

According to Figs. 4 to 7 the ends of the spokes 1 are curved so as to correspond to the surface of the hollow celluloid rim 2 provided with recesses 3, in which the curved ends of the spokes 1 lie in such a manner, that the outer surface is an even one. The edges 3ª of the recesses 3 prevent the spoke system from being turned in respect to the rim. The attachment of a spoke and the rim is made by a nut 4 and a bolt 5. The nut is prismatic at the outside and has a lower flange 6, which abuts against the lower edge of a celluloid cylinder 7 surrounding the nut 4. A recess 2ª of the hollow rim portion 2ᵇ receives the cylinder 7. The attachment between the rim 2 and the cylinder 7 is made by pouring in liquid celluloid, which after hardening is free from separating fissures.

Figure 9:
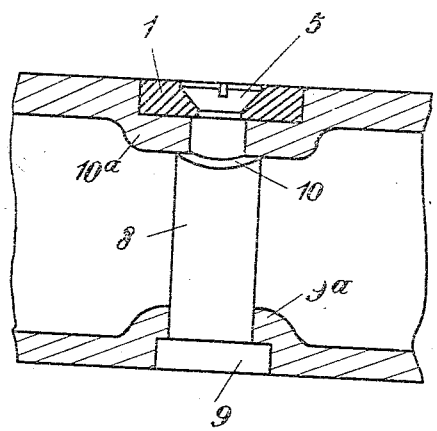

According to Figs. 8 and 9 a nut 8 is set into a hole of the celluloid rim 2, a flange 9 and a shoulder 10 of the nut, abutting against correspondingly formed strengthened parts 9ª and 10ª of the rim 2. After the insertion of the bolt 5 the spider and the rim are pressed together between the nut 8 and the bolt 5, thereby preventing the spider and the rim from being separated unintentionally. The wall of the hollow celluloid rim described thereabove is so thick, that the rim has the required firmness.

According to Figs. 10 and 11 a nut 11 is grappled in a fusible mass 12 brought into the hollow celluloid rim and hardened within the same. This mass can fill the whole inner room of the rim or it can only be arranged on the places of the attachment of the spokes to the rim. In the first case the rim is fastened by the filling mass 12, and the wall of the celluloid rim can be considerably thinner than in the cases of the Figs. 4 to 9 or in the second case of the said alternative. The nut 11 is secured absolutely by the filling mass in the celluloid rim, so that also the connection of the rim with the spider by means of the threaded bolt 5 is a very perfect one.

The constructions described in connection with the Figs. 4 to 11 allow to manufacture as separate articles of trade both the rim and the spider and to unite the same when and wherever required. Therefore both the rim and the spider are interchangeable with other rims or spokes respectively.

I claim as my invention:

1. A steering wheel comprising a hollow circular celluloid rim, a filler therein composed of a hardening material, a spider, and spokes on the spider projecting with their ends into the body formed by the rim and the filler.

2. A steering wheel comprising a hollow annular celluloid rim, a filler therein composed of a hardening material, an inner ring in the rim formed of reed, a spider, and spokes thereon projecting with their ends into the body formed by the rim, the ring and the filler.

3. A steering wheel comprising a hollow annular celluloid rim having recesses in its circumference, a filler in said rim, a spider, spokes on the spider having ends projecting into said recesses, and means for securing said spoke ends in the recesses of the rim.

4. A steering wheel comprising a hollow annular celluloid rim having recesses in its circumference, a filler in said rim, a spider, spokes on the spider having curved ends projecting into the said recesses and flush with the outer surface of the rim when applied, and means for securing the curved spoke ends in the recesses of the rim and separating them therefrom.

Signed at Nuremberg, Germany, this 20th day of February, 1913.

WILLY WOLFF.

Witnesses:
OSCAR BOCK,
RALPH W. DOX.